United States Patent Office 2,961,476
Patented Nov. 22, 1960

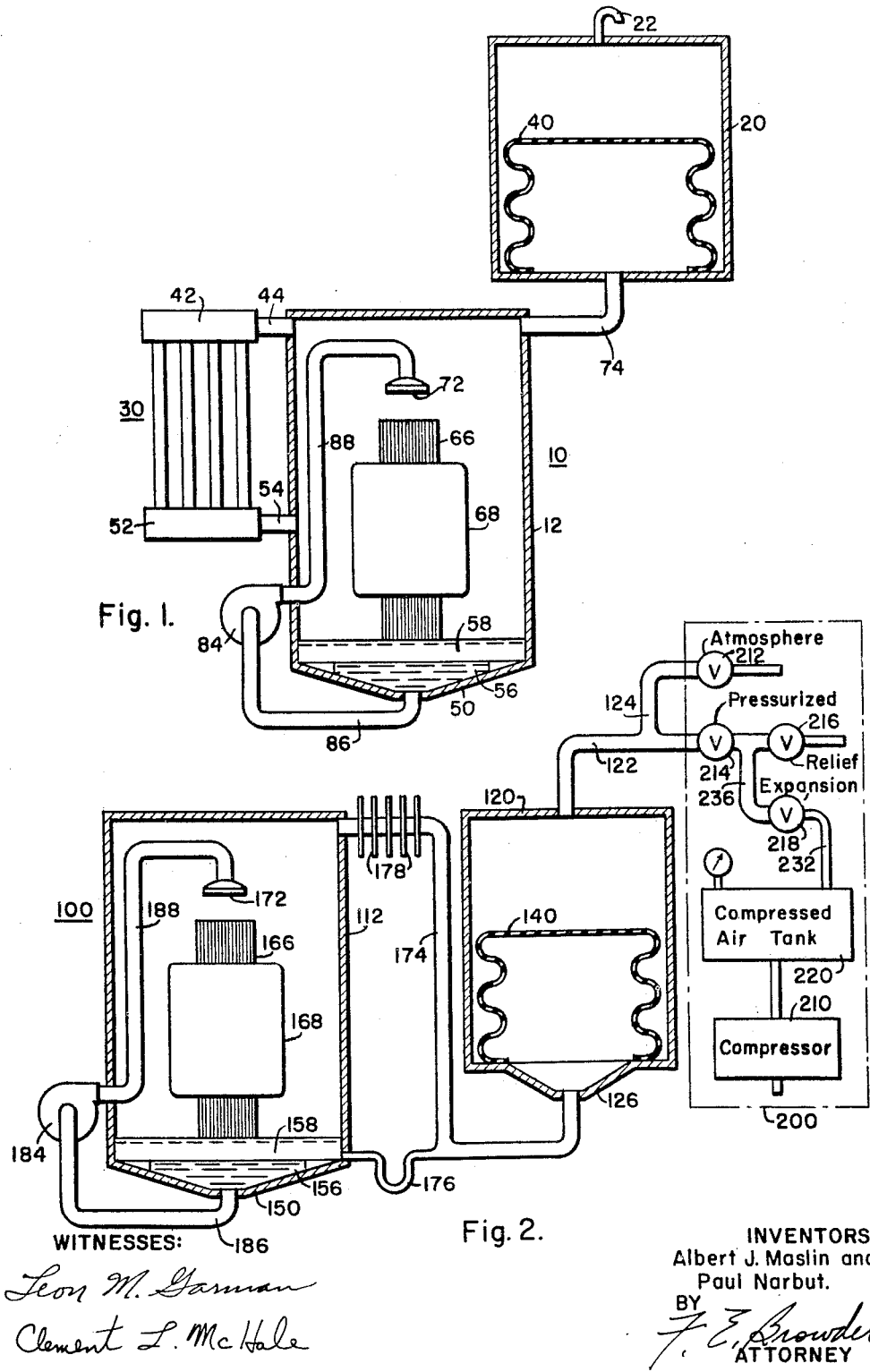

2,961,476

ELECTRICAL APPARATUS

Albert J. Maslin, Sharon, and Paul Narbut, Hickory Township, Mercer County, Pa., assignors to Westinghouse Electric Corporation, East Pittsburgh, Pa., a corporation of Pennsylvania Filed June 24, 1958, Ser. No. 744,182

10 Claims. (Cl. 174—15)

This invention relates to electrical apparatus, and more particularly to apparatus utilizing vaporization of a liquid dielectric to dissipate the heat developed during operation of the apparatus and utilizing the vapors of the dielectric liquid as an insulating medium.

In U.S. Patent No. 2,561,738, filed November 4, 1949, by C. F. Hill and assigned to the same assignee as this application, there is disclosed an enclosed electrical apparatus employing a relatively small amount of fluorinated organic liquid coolant which is sprayed or applied over the electrical windings of the apparatus to cool them by evaporation of the liquid coolant, the evolved vapors constituting a part of an electrically insulating gas mixture. Such apparatus is efficient in operation but has the disadvantage that the pressure of the insulating gas mixture developed within the casing varies greatly during the operation of the apparatus. In order to prevent excessive pressures within the casing of such apparatus, it is desirable to provide means with such apparatus for maintaining the pressure of the insulating gas within the casing at substantially a predetermined value whereby excessive pressures are prevented and the dielectric strength of the insulating gas is maintained above a minimum value.

It is an object of this invention to provide a new and improved electrical apparatus including elements sealed in an enclosing casing, a vaporizable liquid fluorinated compound for cooling and insulating such elements, a non-condensable gas for insulating said elements until said liquid compound vaporizes, and means for segregating the vapors of said liquid and said non-condensable gas after said apparatus heats up.

Another object of this invention is to provide a sealed electrical apparatus including an enclosed casing, an insulating gas which comprises a mixture of the vapors of a liquid fluorinated compound which also serves in the cooling of the apparatus, and a non-condensable gas which is segregated from the vapors of the compound as the temperature of the apparatus increases, and means for maintaining the pressure in said casing within predetermined limits.

Other objects of the invention will in part be obvious and will in part appear hereinafter.

For a fuller understanding of the nature and objects of the invention, reference should be had to the following detailed description taken in connection with the accompanying drawing in which:

Figure 1 is a diagrammatic view of a transformer constructed in accordance with this invention, and Fig. 2 is a diagrammatic view of a transformer illustrating a second embodiment of this invention.

In accordance with this invention, an enclosed electrical apparatus is provided that combines the advantages of the liquid dielectric filled type of apparatus in many respects, and also the advantages of the gas filled types of electrical equipment with few or none of the disadvantages of either type of apparatus, and with several unique advantages of its own. Specifically, the operating electrical elements or windings of the apparatus are cooled by flowing, spraying, or otherwise distributing over the surface to be cooled in layers, streams, or films of certain liquid fluorinated organic compounds having a boiling point of between 50° C. and 225° C. at atmospheric pressure. The fluorinated organic compound or a mixture of two or more compounds cools the electrical elements mainly by its evaporation. The fluorinated organic compound vapors so evolved flow to the enclosing casing in which the elements are disposed and condense on contact with a relatively cool wall of the casing or they may be condensed in a radiator or by other suitable means. The condensed liquid compound and any portion that did not evaporate when sprayed or flowed over the electrical windings are collected and reflowed or resprayed. A relatively small amount of liquid fluorinated organic compound has been found to be sufficient for effective cooling of a particular electrical apparatus.

In order to provide the necessary insulation during the operation of the electrical apparatus, an insulating gas is provided in the casing of the electrical apparatus which is a mixture of a relatively inert, non-condensable gas and the vapors of the fluorinated organic compound. The non-condensable gas is necessary to insure adequate initial insulation and to enable operation with relatively slight variation in the internal gas pressure in the casing. When the apparatus is cold or inoperative, the non-condensable gas constitutes the predominant volumetric proportion of the insulating gas, and the vapors of the fluorinated compound constitute the minor components. When the apparatus is operating, the temperature will increase with the applied load and the composition of the atmosphere immediately surrounding the windings will comprise a greater proportion of the vapors of the fluorinated compound. Mixtures of a non-condensable gas, such as sulfur hexafluoride or nitrogen, and the vapors of the fluorinated compounds, however, are not efficient in conveying heat from the windings to the casing walls or radiator of an electrical apparatus, since the non-condensable gas impedes the flow of the evolved vapors to the radiator or casing walls and impairs their condensation. In order, therefore, to obtain the most efficient dissipation of the heat developed in the operating elements of an enclosed apparatus, the non-condensable gas must be segregated from the vapors of the fluorinated compound during operation so that substantially only the vapors of the fluorinated compound are present in the portion of the casing adjacent to the operating elements. For this purpose, the casing of the apparatus is provided with a connecting gas reservoir of sufficient volume to receive the non-condensable gas during operation which would otherwise be distributed throughout the casing. Such a gas reservoir is connected at the upper part of the casing since the vapors of the fluorinated compound are denser than any non-condensable gas found to be practical in the apparatus and the segregation of the gases utilizes this difference in density.

In order to maintain the pressure within the casing and the gas reservoir at substantially a predetermined value, a flexible container is provided in the reservoir having a volume adapted to vary with the quantity of non-condensable gas which is driven from the casing as the temperature of the apparatus increases and the partial pressure of the evolved vapors increases. The exterior of the flexible container is subjected to the pressure of a gas, such as air, having a predetermined pressure, such as atmospheric pressure or some other predetermined pressure.

Different vaporizable liquid coolants are known to those skilled in the art and can be employed in practicing this invention. In practice, it is preferred to utilize the vaporizable liquid coolants disclosed in the Hill Patent 2,561,738.

As disclosed in the Hill patent, the vaporizable liquid coolant may comprise the liquid fluorinated organic compounds selected from the group consisting of hydrocarbons, hydrocarbon ethers and tertiary hydrocarbon amines in which at least half the hydrogen atoms have been substituted by at least one halogen selected from the group consisting of chlorine and fluorine, and of which at least half of the halogen is fluorine. The hydrocarbons and the hydrocarbon groups attached to oxygen or nitrogen atoms may be aliphatic, aromatic, cycloaliphatic and alkaryl. Liquid perfluorocarbons, perfluorocarbon ethers and perfluorocarbon tertiary amines boiling between 50° C. and 225° C. have outstanding properties. Perhalocarbon compounds composed of only carbon and a halogen selected from at least one of the group consisting of chlorine and fluorine, of which fluorine comprises at least half the halogen atoms are excellent liquid coolants for the purpose of this invention.

The vapors of the fluorinated organic compound referred to hereinbefore have outstanding electrical insulating properties. They are superior to practically all other gases in such electrical insulating characteristics as breakdown strength, dielectric strength, power factor and resistance to formation of corona under similar conditions of temperature and pressure. These compounds are outstanding in their stability to chemical and thermal breakdown, being surpassed only by the permanent gases. The fluorinated compounds in the liquid state exert negligible, if any, solvent or deteriorating action on ordinary insulating materials and varnishes employed in the preparation of conventional electrical elements such as windings, cores and coils.

As examples of specific fluorinated organic compounds which may be utilized in practicing this invention either alone or in mixtures, reference may be had to the following list of fluorinated organic compounds:

| | Boiling point, ° C. |
|---|---|
| Perfluorophenanthrane | 205 |
| Perfluorodibutyl ether | 100 |
| Perfluorotriethyl amine | 71 |
| Perfluorotributyl amine | 178 |
| Perfluorodimethylcyclohexane | 101 |
| Perfluoromethylcyclohexane | 76 |
| Perfluoro-n-heptane | 82 |
| Perfluorotoluene | 102 |
| Perfluorocyclic ether ($C_8F_{16}O$) | 101 |
| Perfluorocyclic ether ($C_6F_{12}O$) | 56 |
| Monochlorotetrafluoro-(trifluoromethyl) benzene | 137 |
| Dichlorotrifluoro-(trifluoromethyl) benzene | 170 |
| trichlorodifluoro-(trifluoromethyl) benzene | 207 |
| Monochloropentadecafluoroheptane | 96 |
| 2-chloro-1,4-bis(trifluoromethyl) benzene | 148 |
| 2-chlorotrifluoromethylbenzene | 150 |
| Perfluorodiethylcyclohexane | 148 |
| Perfluoroethylcyclohexane | 101 |
| Perfluoropropylcyclohexane | 123 |
| Chlorononafluorobis(trifluoromethyl)cyclohexane | 129 |
| Perfluoronaphthalene | 140 |
| Perfluoro-1-methylnaphthalane | 161 |
| Perfluorodimethylnaphthalanes | 177 to 179 |
| Perfluoroindane | 116 to 117 |
| Perfluorofluorane | 190 |
| Perfluorobicyclo-(2.2.1)heptane | 70 (746 mm.) |

The amines and ethers may have dissimilar halogen substituted hydrocarbon groups present as, for example, 2,2-dichloro-1,1,1-trifluoroethyl-perfluorobutyl ether and perfluorodibutylethyl amine. The freezing points of the above-listed liquid compounds are below 0° C., many being below −50° C., so that they can be safely employed, individually or in mixtures, under nearly all ambient conditions to be expected in services.

Examples of preferred suitable fluorinated compounds are the perfluorocyclic ethers, such as the compound having the formula $C_8F_{16}O$, although it will be understood that other fluorinated compounds as defined herein may be substituted in whole or in part therefor. The physical properties of the perfluorocyclic ether ($C_8F_{16}O$) are as follows:

Boiling point, 101° C.
Heat of vaporization, 21 calories per gram at the boiling point
Specific heat, 0.26 calories per gram
Density, 1.76
Freezing point, −100° C.

The heat of vaporization varies with the fluorinated compound being used and falls in the range of about 18 to 50 calories per gram.

Referring now to the drawing and Fig. 1 in particular, there is illustrated an electrical apparatus, specifically a transformer 10, comprising a sealed casing 12 within which is disposed a magnetic core 66, and the electrical windings 68 associated therewith which are supported on a suitable means such as the base member 58. For the purpose of simplifying the drawing, the leads to the windings 68 and the bushings normally carried by the top or cover of the casing 12 are not shown. The windings 68 are subjected to the flow of electrical current during service which develops heat in the core 66 and the windings 68.

The bottom of the casing 12 is formed to provide a sump 50 in which there is disposed a supply 56 of a fluorinated organic compound such as perfluorocyclic ether. As illustrated, the supply of the fluorinated compound is so small that it does not come in contact with the core 66 or the windings 68 although it is to be understood that a small portion of the core 66 and the windings 68 may be immersed in the fluorinated compound in a particular application. A conduit 86 is connected to the bottom of the sump 50 for withdrawing the liquid compound therefrom upon operation of a pump 84 connected to the conduit 86. The liquid compound passes from the pump 84 through a conduit 88 to a spray or flow device 72 for distributing or applying a spray or flow (not shown) of the fluorinated liquid compound over the core 66 and the windings 68.

Liquid fluorinated compound sprayed from the device 72 distributes itself as a thin film over the electrical windings 68 and the core 66 and is caused to evaporate freely if the core and coil are hot, thereby absorbing heat from the core and coils proportional to the amount of the compound vaporized and its heat of vaporization. The evolved vapors of the compound flow to the walls of the casing 12 where some condensation takes place. The condensate and any excess of liquid compound applied on the core and coils flow back into the sump 50 for recirculation. The vapors, being heavier than the non-condensable gas, enter the radiator or heat exchanger 30 through the lower inlet 54 which also serves as a path for the condensed liquid compound to flow back into the casing 12. The flow of the gas-vapor mixture is upward through the radiator 30, entering through the inlet 54 and returning to the casing 12 through the outlet 44. In a particular application, it may not be necessary to employ a radiator if the walls of the casing 12 are adequate to dissipate the developed heat to the atmosphere.

The casing 12 of the transformer 10 is initially charged with a quantity of a relatively inert gas, substantially non-condensable at moderate pressures and ordinary atmospheric temperatures, such as those encountered over the normal operating temperature range of the transformer 10. Examples of preferred suitable non-condensable gases include sulfur hexafluoride, perfluoropropane ($C_3F_8$), perfluorocyclobutane ($C_4F_8$), and nitrogen or a mixture of two or more of these gases. Perfluoropropane has a boiling point of approximately —20° C. and perfluorocyclobutane has a boiling point of approximately —4° C. at atmospheric pressure. A change of a suitable liquid fluorinated compound or liquid fluorocarbon, such as perfluorocyclic ether, is then introduced into the casing 12. The non-condensable gas may be introduced into the casing 12 at substantially atmospheric pressure and atmospheric temperature. When the transformer is cold or inoperative, the liquid fluorinated compound will have only a small partial pressure due to the presence of a small amount of vapors from the liquid compound. As the temperature of the core 66 and the windings 68 increases, the partial pressure of the vapors of the fluorinated compound will increase to thereby drive or push the non-condensable gas, such as sulfur hexafluoride, into the upper portion of the casing 10, since the density of a suitable non-condensable gas, such as sulfur hexafluoride, will be less than the density of the vapors of a suitable liquid fluorinated compound.

In order to provide for the segregation or separation of the sulfur hexafluoride from the vapors of the fluorinated compound in the casing 12 as the temperature of the windings 68 and the core 66 increases, a gas reservoir 20 is provided having a restricted gas passageway or conduit 74 connected near the top or to the top portion of the casing 12. The volume of the gas reservoir 20 is substantially equal to the volume of the gas space inside the casing 12. A flexible container 40 such as a collapsible bag or bellows is disposed inside the casing 20 with the open end of the container 40 hermetically secured to the inside of the reservoir 20. The flexible container 40 is preferably made of a suitable elastomeric material, such as butyl rubber. The flexible container 40 can be secured or sealed to the inside lower portion of the reservoir 20 as illustrated by a suitable means, such as a flange arrangement or bonded, cemented or vulcanized to the reservoir 20 or by using a molding compound. Means are provided for applying a predetermined pressure to the exterior of the flexible container 40, such as the opening or vent 22 at the top of the reservoir 20, whereby atmospheric pressure is applied to the flexible container 40. It is to be understood that the open end of the flexible container 40 could also be secured to the upper portion of the reservoir 20 in a particular application. Since the exterior of the flexible container 40 is exposed to air at ambient temperature, and since no heat is generated within the reservoir 20, the temperature inside the reservoir 20 is normally lower than the temperature inside the casing 12, and is very nearly equal to the ambient temperature.

The flexible container 40 as shown in Fig. 1 is adapted to be substantially collapsed at the lower end of the reservoir 20 when the transformer 10 is cold or inoperative. As the core 66 and the windings 68 heat up during operation of the transformer 10, the partial pressure of the vapors of the fluorinated compound increase to thereby drive the sulfur hexafluoride into the reservoir 20. The flexible container 40 then expands to increase its volume to permit accommodation of the non-condensable gas as the temperature of the transformer 10 increases. The flexible container 40 is adapted to substantially fill the reservoir 20 at a predetermined load or operating condition of the transformer 10, such as full load. For the latter operating condition, the insulating gas in the casing 12 is substantially composed of the vapors of the fluorinated compound and substantially all of the non-condensable gas will be segregated in the gas reservoir 20. Since the exterior of the flexible container 40 is exposed to a predetermined pressure, specifically atmospheric pressure, the pressure of the insulating gas in the casing 12 will be maintained at substantially atmospheric pressure and the pressure of the non-condensable gas enclosed by the flexible container 40 will also be maintained at substantially atmospheric pressure.

If any of the vapors of the fluorinated compound enter the gas reservoir 20 during operation, the lower temperature inside the reservoir 20 will cause the vapors to be condensed and the liquid compound will flow back into the casing 12 through the conduit 74. The reservoir 20, as illustrated in Fig. 1, should be disposed above the casing 12 since segregation of the non-condensable gas depends upon the difference in density between the non-condensable gas, which is less dense than the vapors of the fluorinated compound and is therefore driven to the top portion of the casing 12 as the partial pressure of the vapors of the fluorinated compound increases during operation of the transformer 10.

In summary, the casing 12 of the transformer 10 and the flexible container 40 which is disposed to be in communication with the casing 12 through the gas passageway 74 form a closed system having a volume which varies with the partial pressures of the vapors of the fluorinated compound as the temperature of the core 66 and the windings 68 varies during operation of the transformer 10. The dielectric strength of the insulating gas in the casing 12 is provided initially by the non-condensable gas which substantially fills the gas space in the casing 12 before the partial pressure of the vapors of the fluorinated compound has increased to a substantial value. As the pressure of the vapors increases, the non-condensable gas is pushed into the top portion of the casing 12 and gradually displaced into the gas reservoir 20 until substantially all of the non-condensable gas is pushed into the gas reservoir 20 whose volume varies with the expansion and contraction of the flexible container 40 to accommodate the non-condensable gas in the reservoir 20. Since the volume of the flexible container 40 readily adjusts itself to accommodate the non-condensable gas displaced from the casing 12 there is only a small pressure differential between the interior of the container 40 and the exterior of the container 40 and the pressure in the closed system formed by the casing 12 and the flexible container 40 is maintained at substantially a predetermined value.

Referring to Fig. 2, a transformer 100 is illustrated which is similar to the transformer 10 except that the reservoir provided need not be disposed above the casing of the transformer 100 and a predetermined pressure is maintained in the casing of the transformer 100 and its associated reservoir at a pressure other than atmospheric pressure. It is sometimes desirable or necessary in a particular application to maintain the insulating gas inside the casing of a transformer at a pressure higher than atmospheric pressure in order to provide the dielectric strength needed to operate the core and windings of the transformer at higher potentials or voltages.

In particular, the transformer 100 comprises an enclosing casing 112 in which are disposed a magnetic core 166 and associated electrical windings 168 which are supported on a suitable means such as the beam 158. In similar fashion to the transformer 10 shown in Fig. 1, means is provided for dissipating the heat developed in the core 166 and the windings 168 which results when electric current flows through the windings 168 during operation of the transformer 100. A sump 150 in which is disposed a supply of fluorinated compound 156 is provided at the bottom of the casing 112. A pump 184 is connected through a conduit 186 to withdraw the liquid fluorinated compound from the sump 150 and apply the liquid compound to the core 166 and the windings 168 through the conduit 188 and the spray or flow device 172.

In order to provide for segregating the non-condensable gas in the casing 112 from the vapors of the fluorinated compound, a gas reservoir 120 having a gas passageway or conduit 174 connected to the top portion of the casing 112 is disposed adjacent to the casing 112. A flexible container 140 is disposed inside the reservoir 120 and hermetically secured or sealed to the inside bottom portion of the reservoir 120. In order to prevent the hot vapors of the fluorinated compound from entering the reservoir 120, means associated with the gas passageway 174 may be provided for condensing the vapors of the compound which enter the passageway 174, specifically the cooling fins 178, which are secured to the gas passageway 174. If any of the vapors do enter the reservoir 120, they will condense and the liquid will flow back through the gas passageway 174 to the sump 150 in the casing 112 through a return conduit 176 connected between the gas passageway 174 and the lower portion of casing 112 adjacent to the sump 150. The lower end of the reservoir 120 may be provided with a sloping portion 126 in a particular design as illustrated in Fig. 2 to facilitate drainage of any condensed vapors which enter the reservoir 120. The return conduit 176 includes a U-shaped portion which operates as a liquid trap to prevent hot vapors of the fluorinated compound from entering the reservoir 120 through the conduit 176.

In order to maintain the pressure in the casing 112 and the gas reservoir 120 at substantially a predetermined pressure, which in this case is higher than atmospheric pressure, a pressure regulating means 200 is provided to apply a substantially predetermined pressure to the exterior of the flexible container 140. The pressure regulating means 200 is connected to the top of the gas reservoir 120 by means of a conduit 122.

In particular, the pressure regulating means 200 includes a compressor 210, a compressed air tank 220, first and second pressure responsive valves 216 and 218, and two manually operated valves 212 and 214.

In the operation of the pressure regulating means 200, the compressor 210 supplies compressed air or other gas to the compressed air tank 220. Assuming that the pressure in the casing 112 and the reservoir 120 is to be maintained at a predetermined pressure higher than atmospheric pressure, the manually operated valve 212 is closed and the manually operated valve 214 is opened. Whenever the pressure inside the casing 112 and the corresponding pressure inside the reservoir 120 decreases to a predetermined level below the pressure which is to be maintained inside the casing 112 and the reservoir 120, the pressure rseponsive valve 218 opens and compressed air flows from the compressed air tank 220 through the conduit 232 and the valve 218, through the conduit 236 and the valve 214, and the conduit 122 into the casing 120, and the pressure applied to the exterior of the flexible container 140 is increased to the desired predetermined value.

On the other hand, if the pressure inside the casing 112 and the corresponding pressure inside the reservoir 120 increases to a predetermined level above the pressure which is to be maintained in the casing 112 and the reservoir 120, the pressure responsive valve 216 opens and the excess air inside the reservoir 120 flows from the reservoir 120 through the conduit 122, through the valve 214 and through the pressure responsive valve 216 to atmosphere until the pressure inside the reservoir 120 which is applied to the exterior of the container 140 has returned to the desired predetermined value. If it is desired to maintain the closed system which includes the casing 112 and the volume of the flexible container 140 at atmospheric pressure, the manually operated valve 214 may be closed and the manually operated valve 212 may be opened to provide a vent or opening from the reservoir 120 through the conduit 122 and the conduit 124, and through the valve 212 to atmosphere.

In summary, the transformer 100 operates similarly to the transformer 10 shown in Fig. 1, except that the pressure in the casing 112 and the reservoir 120 may be maintained at a predetermined value not only equal to but also higher than atmospheric pressure. In addition, it is not necessary to have the gas reservoir 120 at a higher elevation than the casing 112 since means are provided for preventing the entrance of the hot vapors of the fluorinated compound into the reservoir 120 and means are also provided for returning any small amount of vapors which do enter the reservoir 120 through a return conduit 176 which includes a liquid seal to also prevent the entrance of hot vapors into the reservoir 120.

It is to be understood that the pressure regulating means 200 may also be employed with the transformer 10 shown in Fig. 1 in order to apply a predetermined pressure to the exterior of the flexible container 40 to thereby maintain the pressure inside the casing 12 and the reservoir 20 at a predetermined value. It is also to be understood that a radiator 30 may be attached to the casing 112 of the transformer 100 shown in Fig. 2, and that cooling means such as the cooling fins 178 may be applied to the transformer 10 shown in Fig. 1, as required in particular applications. A different type of pressure regulating means may also be substituted for the pressure regulating means 200 shown in Fig. 2, such as a system incorporating a pressure sensitive device to sense the pressure in the casing 112 of the transformer 100 or the pressure inside the reservoir 120 to thereby control the operation of electrically operated valves to control the entrance of compressed air or the venting of compressed air during the operation of the pressure regulating means. In addition, gases other than air may be compressed and applied to the exterior of the flexible container 140.

The apparatus embodying the teachings of this invention has several advantages. An important advantage is that a sealed electrical apparatus such as a transformer incorporating the teachings of this invention may take advantage of a non-condensable gas to maintain dielectric strength during the initial operation of the apparatus, and the efficient cooling of the vapors of a fluorinated compound after the pressure of the vapors has increased sufficiently to provide the minimum dielectric strength needed for insulation, without an undesirable increase in the pressure of the insulating gas inside the apparatus during its operation. In addition, the pressure differential across the flexible container disposed in the gas reservoir of such a transformer is very slight thus reducing the leakage of the non-condensable gas or the vapors of the fluorinated compound to a minimum. The flexible container also operates at a temperature near the ambient temperature and therefore is not subject to rapid aging due to high operating temperatures.

It should be noted that only the transformer casing and the flexible container need be hermetically sealed. The balance of the gas reservoir included with a transformer of this type need not be hermetically sealed even if the pressure inside the reservoir which is applied to the exterior of the flexible container is maintained at a value higher than atmospheric pressure by means of compressed air.

Since numerous changes may be made in the above-described apparatus and different embodiments of the invention may be made without departing from the spirit, it is intended that all the matter contained in the foregoing description or shown in the accompanying drawing shall be interpreted as illustrative and not in a limiting sense.

We claim as our invention:

1. In a sealed electrical apparatus, in combination, an enclosing casing, a core and coil in said casing, said coil being subjected to the flow of electric current which develops heat in said core and coil, means for dissipating the heat from said core and coil comprising a supply of liquid fluorocarbon boiling at a temperature between 50° C. and 225° C. at atmospheric pressure and means for applying a thin layer of the liquid fluorocarbon over the core and coil to cool them by evaporation, a gas reservoir having a gas passageway connected to said casing, a flexible, gastight container having an open end hermetically secured to the inside of said reservoir to form a closed system, an insulating gas in said casing comprising a mixture of a gas non-condensable over the normal operating range of said apparatus and the vapors of said fluorocarbon, the insulating gas consisting predominantly of non-condenable gas by volume when the apparatus is cold, the fluorocarbon vapors being denser than the non-condensable gas, the pressure of the vapors of said fluorocarbon increasing as the apparatus heats up during operation to drive said non-condensable gas into said reservoir, said flexible container being substantially collapsed for a first predetermined operating condition and substantially filling said reservoir for a second predetermined operating condition of said apparatus when said non-condensable gas is driven into said reservoir, and means for maintaining the pressure in said casing and reservoir at substantially a predetermined value to maintain the dielectric strength of said insulating gas above a minimum value.

2. In electrical apparatus, the combination comprising an enclosing main casing, a source of heat disposed in said main casing, means for dissipating the heat from said source comprising a supply of fluorinated organic liquid coolant, the coolant boiling at a temperature between 50° C. and 225° C. at atmospheric pressure and means for applying a layer of said coolant over said source to cool it by evaporation of said coolant to a condensable vapor, the vapor of said coolant having an effective dielectric strength, an auxiliary casing, conduit means for connecting said auxiliary casing to said main casing, a collapsible bag disposed in said auxiliary casing and having an open end hermically secured to the inside of said auxiliary casing to form a closed system, insulating gas in the main casing comprising a mixture of a gas substantially non-condensable under ordinary atmospheric temperatures and moderate pressures and the vapors of said fluorinated coolant with the non-condensable gas being volumetrically preponderant when the apparatus is cold, the vapors of said coolant being denser than the non-condensable gas, the proportion of the vapors of said coolant in said main casing increasing, said non-condensable gas being driven into said auxiliary casing as the temperature of said source increases, said container being substantially collapsed for a first predetermined operating condition of said apparatus and substantially filling said auxiliary casing for a second predetermined operating condition of said apparatus when said non-condensable gas is driven into said reservoir and means for maintaining the pressure in said main casing and said auxiliary casing at substantially a predetermined value to maintain the dielectric strength of said insulating gas above a minimum value.

3. In a sealed transformer, an enclosing casing, a core and winding disposed in the casing, the winding being subjected to an electrical current in service whereby heat develops in the core and winding, means for dissipating the heat which develops in the core and winding comprising a supply of fluorocarbon liquid boiling at a temperature between 50° C. and 225° C. at atmospheric pressure and means for distributing a thin layer of the liquid fluorocarbon over said core and winding whereby cooling of the core and winding is effected mainly by evaporation of the fluorocarbon, a gas reservoir having a gas passageway connected to said casing, a flexible container having an open end hermetically secured to the inside of said reservoir, an insulating gas disposed in said casing comprising a mixture of a gas substantially non-condensable over the normal operating temperature range of said apparatus and the vapors of said liquid fluorocarbon, the vapors of said fluorocarbon being denser than said non-condensable gas, the non-condensable gas being volumetrically predominant in said casing when said apparatus is cold and gradually being driven into said reservoir as said core and winding heat up and the pressure of the vapors of said fluorocarbon increases, cooling means disposed on said gas passageway for condensing the vapors of said fluorocarbon which enter said passageway to substantially prevent the entrance of said vapors into said reservoir, the volume of said reservoir being substantially equal to the gas space in said casing to permit the segregation of substantially all said non-condensable gas and means for maintaining the pressure in said casing and said reservoir at substantially a predetermined value, to maintain the dielectric strength of said insulating gas above a minimum value, the volume of said container varying with the pressure of said vapors to allow the entrance of said non-condensable gas into said reservoir as said apparatus heats up and to permit more efficient cooling by said vapors.

4. In a sealed electrical apparatus, in combination, an enclosing casing having a sump therein, an electrical winding disposed in said casing which is subjected to electrical current in service which develops heat in said winding, means for dissipating the heat from the winding comprising a supply of liquid fluorocarbon compound which boils at a temperature between 50° C. and 225° C. at atmospheric pressure and means for applying a thin layer of said liquid fluorocarbon over said winding whereby cooling of the winding is effected mainly by evaporation of the liquid fluorocarbon, a gas reservoir having a gas passageway connected to said casing near the top of said casing, a flexible gastight container having an open end hermetically sealed to the inside of said reservoir, an insulating gas in said casing comprising a mixture of gas non-condensable over the normal operating temperature range of said apparatus and the vapors of said fluorocarbon compound, the vapors of said fluorocarbon compound being denser than said non-condensable gas, the insulating gas being composed predominately of non-condensable gas when the apparatus is cold and increasingly of the vapors of the fluorocarbon compound as the temperature of said apparatus increases and the pressure of said vapors drives said non-condensable gas into said reservoir, the enclosed volume of said container being adapted to vary with the pressure of said vapors to permit said non-condensable gas to enter said reservoir as the temperature of said apparatus increases, cooling means disposed on said passageway condensing the vapors of the fluorocarbon compound which enter said passageway, a return conduit having a liquid trap connected between said reservoir and said reservoir adjacent said sump to return condensed vapors which enter said reservoir to said sump, the volume of said reservoir being substantially equal to the gas space in said casing to permit the segregation of substantially all said non-condensable gas, and means for maintaining the pressure in said casing and reservoir at substantially a predetermined value to maintain the dielectric strength of said insulating gas above a minimum value.

5. In a sealed electrical apparatus, in combination, an enclosing casing, a core and coil in said casing, said coil being subjected to the flow of electric current which develops heat in said core and coil, means for dissipating the heat from said core and coil comprising a supply of liquid fluorocarbon boiling at a temperature between 50° C. and 225° C. at atmospheric pressure and means for applying a thin layer of the liquid fluorocarbon over the core and coil to cool them by evaporation, a gas reservoir having a gas passageway connected to said casing, a flexible, gastight container having an open end hermetically secured to the inside of said reservoir to form a closed system, an insulating gas in said casing comprising a mixture of a gas non-condensable over the normal operating range of said apparatus and the vapors of said fluorocarbon, the insulating gas consisting predominantly of non-condensable gas by volume when the apparatus is cold, the fluorocarbon vapors being denser than the non-condensable gas, the pressure of the vapors of said fluorocarbon increasing as the apparatus heats up during operation to drive said non-condensable gas into said reservoir, said flexible container being substantially collapsed for a first predetermined operating condition and substantially filling said reservoir for a second predetermined operating condition of said apparatus, the volume of said reservoir being substantially equal to the gas space in said casing to permit the segregation of substantially all said non-condensable gas and means external to said casing and said reservoir for maintaining the pressure in said casing and reservoir at substantially a predetermined value to maintain the dielectric strength of said insulating gas above a minimum value, said means for maintaining the pressure including a plurality of pressure responsive valves and means for applying a compressed gas to the exterior of said container.

6. In a sealed electrical apparatus, in combination, an enclosing casing, an electrical winding disposed in said casing and subjected to the flow of current which heats up said winding, means for dissipating the heat from said winding comprising a supply of liquid fluorinated compound having a boiling point between 50° C. and 225° C. at atmospheric pressure and means for applying a thin layer of said liquid compound over said winding whereby cooling of the winding is effected mainly by evaporation of the liquid compound, a gas reservoir of a volume substantially equal to the gas space in said casing having a gas passageway connected to the upper portion of said casing, said gas reservoir being disposed above said casing, a flexible gastight container having an open end hermetically secured to the inside of said reservoir, an insulating gas in said casing comprising a mixture of a gas non-condensable in the normal operating temperature range of said apparatus and the vapors of said fluorinated compound, the insulating gas being composed predominantly of said non-condensable gas when said apparatus is cold, the proportion of the vapors of said fluorinated compound increasing with the temperature of said winding and with the pressure of the vapors as the non-condensable gas is driven into said reservoir, the volume of said container varying with the pressure of said vapors to permit substantially all the non-condensable gas to enter said reservoir at a predetermined load on said apparatus, and means for maintaining the pressure in said casing and reservoir at substantially a predetermined value to maintain the dielectric strength of said insulating gas above a minimum value.

7. In a sealed transformer, the combination comprising an enclosing casing, a core and coil disposed in said casing, the coil arranged to carry current during operation whereby heat develops in said core and coil, means for dissipating the heat from said core and coil comprising a supply of liquid perfluorocarbon boiling at a temperature between 50° C. and 225° C. at atmospheric pressure and means for applying a thin film of the liquid fluorocarbon over said core and coil to cool said core and coil mainly by evaporation, an insulating gas in said casing comprising a mixture of a gas non-condensable over the normal operating temperature range of said transformer and the vapors of said perfluorocarbon, the vapors of the perfluorocarbon being denser than said non-condensable gas, a gas reservoir having a gas passageway connected to the top portion of said casing, a gastight container of elastomeric material having an open end hermetically secured to the inside of said reservoir, the insulating gas being predominantly non-condensable gas by volume when the transformer is cold and the proportion of the vapors of the perfluorocarbon increasing and the pressure of the vapors drives said non-condensable gas into said reservoir as the temperature of the core and coil increases, said container being adapted to expand and contract as the pressure of the vapors varies and the volume of non-condensable gas driven into said reservoir varies, the volume of said reservoir being substantially equal to the gas space in said casing to permit the segregation of substantially all said non-condensable gas and means for applying atmospheric pressure to the exterior of said container to thereby maintain the pressure in said casing and reservoir at substantially atmospheric pressure and to maintain the dielectric strength of said insulating gas above a minimum value.

8. In a sealed transformer, in combination, an enclosing casing, a core and coil disposed in said casing, said coil carrying electric current in service whereby heat develops in said core and coil, means for dissipating the heat from said core and coil comprising a supply of liquid perfluorocarbon boiling at a temperature between 50° C. and 225° C. at atmospheric pressure and means for applying a thin film of said liquid perfluorocarbon over said core and coil to cool said core and coil mainly by evaporation of the liquid perfluorocarbon, an insulating gas in the casing comprising a mixture of a gas non-condensable over the normal operating temperature range of said transformer and the vapors of said fluorocarbon, the vapors of said fluorocarbon being denser than said non-condensable gas, a gas reservoir having a gas passageway connected to the top portion of said casing, said reservoir being disposed above said casing, a gastight flexible container having an open end hermetically secured to the inside of said reservoir, said insulating gas being composed predominantly of said non-condensable gas when the transformer is cold, the proportion of the vapors of said perfluorocarbon in said insulating gas increasing with the temperature of said core and coil as the pressure of said vapors drives said non-condensable gas into said reservoir, the volume of said container being adapted to vary with the volume of non-condensable gas driven into said reservoir, the volume of said reservoir being substantially equal to the gas space in said casing to permit the segregation of substantially all said non-condensable gas and means for applying compressed air to the exterior of said container at substantially a predetermined pressure to maintain the pressure in said casing and said reservoir at substantially said predetermined pressure to maintain the dielectric strength of said insulating gas above a minimum value.

9. In electrical apparatus, the combination comprising an enclosing main casing, a source of heat disposed in said main casing, means for dissipating the heat from said source comprising a supply of fluorinated organic liquid coolant, the coolant boiling at a temperature between 50° C. and 225° C. at atmospheric pressure and means for applying a layer of said coolant over said source to cool it by evaporation of said coolant to a condensable vapor, the vapor of said coolant having an effective dielectric strength, an auxiliary casing, conduit means for connecting said auxiliary casing to said main casing, a collapsible bag disposed in said auxiliary casing and having an open end hermetically secured to the inside of said auxiliary casing to form a closed system, and insulating gas in the main casing comprising a mixture of a gas substantially non-condensable under ordinary atmospheric temperatures and moderate pressures and the vapors of said fluorinated coolant with the non-condensable gas being volumetrically preponderant when the apparatus is cold, the vapors of said coolant being denser than the non-condensable gas, the proportion of the vapors of said coolant in said main casing increasing, and said non-condensable gas being driven into said auxiliary casing as the temperature of said source increases, said bag being substantially collapsed for a first predetermined operating condition of said apparatus and substantially filling said auxiliary casing for a second predetermined operating condition of said apparatus and means for maintaining the pressure in said main casing and said auxiliary casing at substantially a predetermined value to maintain the dielectric strength of said insulating gas above a minimum value, said means for maintaining the pressure including means for applying compressed gas at substantially a predetermined pressure to the exterior of said bag.

10. In a sealed electrical apparatus, in combination, an enclosing casing having a sump therein, an electrical winding disposed in said casing which is subjected to electrical current in service which develops heat in said winding, means for dissipating the heat from the winding comprising a supply of liquid fluorocarbon compound which boils at a temperature between 50° C. and 225° C. at atmospheric pressure and means for applying a thin layer of said liquid fluorocarbon over said winding whereby cooling of the winding is effected mainly by evaporation of the liquid fluorocarbon, a gas reservoir having a gas passageway connected to said casing near the top of said casing, a flexible gastight container having an open end hermetically sealed to the inside of said reservoir, an insulating gas in said casing comprising a mixture of gas non-condensable over the normal operating temperature range of said apparatus and the vapors of fluorocarbon compound, the vapors of said fluorocarbon compound being denser than said non-condensable gas, the insulating gas being composed predominantly of non-condensable gas when the apparatus is cold and increasingly of the vapors of the fluorocarbon compound as the temperature of said apparatus increases and the pressure of said vapors drives said non-condensable gas into said reservoir, the enclosed volume of said container being adapted to vary with the pressure of said vapors to permit said non-condensable gas to enter said reservoir as the temperature of said apparatus increases, means associated with said passageway for cooling and condensing the vapors of the fluorocarbon compound which enter said passageway, a return conduit having a liquid trap connected between said reservoir and said casing adjacent said sump to return condensed vapors which enter said reservoir to said sump and means for maintaining the pressure in said casing and reservoir at substantially a predetermined value to maintain the dielectric strength of said insulating gas above a minimum value, said means for maintaining the pressure including means for applying compressed gas at substantially a predetermined pressure to the exterior of said container.

References Cited in the file of this patent

UNITED STATES PATENTS

| | | |
|---|---|---|
| 1,227,404 | DuBois | May 22, 1917 |
| 1,600,038 | Canfield | Sept. 4, 1926 |
| 1,965,540 | Atkinson | July 3, 1934 |
| 2,016,247 | Simmons | Oct. 1, 1935 |
| 2,194,604 | Malsbary | Mar. 26, 1940 |
| 2,561,738 | Hill | July 24, 1951 |
| 2,588,436 | Violette | Mar. 11, 1952 |
| 2,711,882 | Narbutovskih | June 28, 1955 |
| 2,858,355 | Narbut | Oct. 28, 1958 |

FOREIGN PATENTS

| | | |
|---|---|---|
| 495,610 | Canada | Aug. 25, 1953 |
| 954,806 | Germany | Dec. 20, 1956 |